(12) United States Patent
Buchner et al.

(10) Patent No.: US 12,673,638 B2
(45) Date of Patent: Jul. 7, 2026

(54) APPARATUS AND METHOD FOR ACTUATING A FUNCTION OF A MOTOR VEHICLE AND MOTOR VEHICLE

(71) Applicant: Bayerische Motoren Werke Aktiengesellschaft, Munich (DE)

(72) Inventors: Christian Buchner, Poing (DE); Kai Hoesl, Iffeldorf (DE); Alexander Maier, Langenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 18/774,035

(22) Filed: Jul. 16, 2024

(65) Prior Publication Data

US 2025/0058740 A1 Feb. 20, 2025

(30) Foreign Application Priority Data

Aug. 17, 2023 (DE) ..................... 10 2023 122 092.6

(51) Int. Cl.
*B60R 25/24* (2013.01)

(52) U.S. Cl.
CPC .......... *B60R 25/24* (2013.01); *B60R 2325/20* (2013.01)

(58) Field of Classification Search
CPC ... B60R 25/24; B60R 2325/20; B60R 25/245; G07C 9/00309; G07C 2209/63; G07C 2009/00555
USPC ........................................................ 340/5.61
See application file for complete search history.

(56) References Cited

U.S. PATENT DOCUMENTS

| | | | | |
|---|---|---|---|---|
| 10,449,929 | B2 * | 10/2019 | Pflug | B60R 25/33 |
| 11,263,842 | B2 * | 3/2022 | Noll | B60R 25/245 |
| 2019/0180542 | A1 * | 6/2019 | Geier | H04K 3/28 |
| 2020/0247361 | A1 * | 8/2020 | Nozaki | G07C 9/00817 |

(Continued)

FOREIGN PATENT DOCUMENTS

| | | |
|---|---|---|
| DE | 199 27 253 A1 | 1/2001 |
| DE | 10 2004 036 920 A1 | 3/2005 |

(Continued)

OTHER PUBLICATIONS

English translation of DE 102004036920 (Year: 2005).*

(Continued)

*Primary Examiner* — Yong Hang Jiang
(74) *Attorney, Agent, or Firm* — Crowell & Moring LLP

(57) ABSTRACT

An apparatus for actuating a function of a motor vehicle. A first transmission/reception device is arranged at a first location of the motor vehicle and is configured to receive a functional signal for actuating a function of the motor vehicle from a functional device different from the motor vehicle. A central transmission/reception device is arranged at a central location of the motor vehicle and is configured to receive the functional signal from the functional device. A control device is in communication with the first transmission/reception device and the central transmission/reception device. The control device is configured to measure and compare a propagation time of the functional signal from the functional device to the first transmission/reception device and a propagation time of the functional signal from the functional device to the central transmission/reception device, and to actuate or disable the function based on the comparison.

8 Claims, 1 Drawing Sheet

(56) References Cited

U.S. PATENT DOCUMENTS

2021/0221330 A1 *  7/2021  Boudet ................. B60R 16/037
2022/0254207 A1 *  8/2022  Billy .................. G07C 9/00309

FOREIGN PATENT DOCUMENTS

FR          3119465 A1 *  8/2022  ......... G07C 9/00309
GB          2 351 171 A   12/2000

OTHER PUBLICATIONS

German-language German Search Report issued in German Application No. 10 2023 122 092.6 dated Mar. 26, 2024, with partial English translation (7 pages).

* cited by examiner

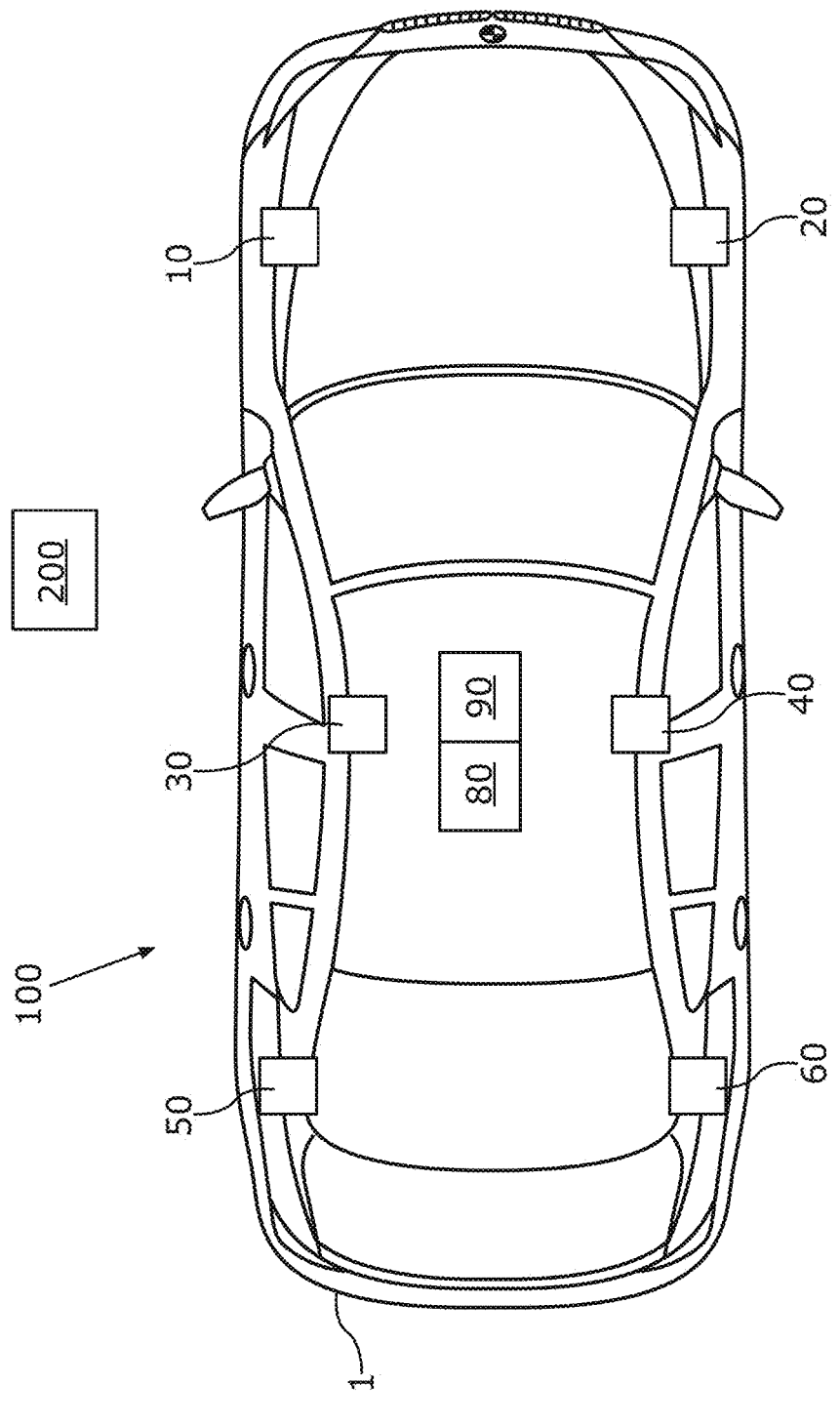

APPARATUS AND METHOD FOR ACTUATING A FUNCTION OF A MOTOR VEHICLE AND MOTOR VEHICLE

CROSS REFERENCE TO RELATED APPLICATION

This application claims priority under 35 U.S.C. § 119 from German Patent Application No. DE 10 2023 122 092.6, filed Aug. 17, 2023, the entire disclosure of which is herein expressly incorporated by reference.

BACKGROUND AND SUMMARY

The invention relates to an apparatus and a method for actuating a function of a motor vehicle, and to a motor vehicle having an apparatus of this type.

Currently, it is possible to access functions of motor vehicles from outside via one or more transmission/reception devices that communicate with a functional device. However, these transmission/reception devices can be manipulated.

It is thus necessary to be protected against an improper artificial extension of the radio range (so-called relay attacks), such that a request signal of the motor vehicle is prevented from being transmitted beyond the original radio range of the motor vehicle to the functional device outside of the vehicle in order to cause the functional device to transmit its response signal without the user's knowledge.

Possible protection against an artificial range extension is known, for example, from DE 199 27 253 A1. Accordingly, an authentication unit is equipped with an additional motion sensor and, upon receiving the request signal from a motor vehicle, it is checked whether the authentication unit has been in motion during a predetermined time interval prior thereto. This solution assumes that a user performs stepping movements when approaching a motor vehicle, which can be detected by the motion sensor and used to verify the plausibility of the activation process. If, on the other hand, the authentication unit is unused, for example in a residential building, it is inoperative and, even in the event that a request signal from a motor vehicle is forwarded to the authentication unit, then a response signal is prevented from being generated by the authentication unit, and so an activation process fails.

An object of the invention is to specify an improved apparatus and an improved method for actuating a function of a motor vehicle. At least this object is achieved according to the invention disclosed herein.

An apparatus according to the invention for actuating a function of a motor vehicle comprises a first transmission/reception device which is arranged at a first location of the motor vehicle and designed to receive a functional signal for actuating a function of the motor vehicle from a functional device different from the motor vehicle, a central transmission/reception device which is arranged at a central location of the motor vehicle and designed to receive the functional signal from the first transmission/reception device, and a control device which is in communication with the first transmission/reception device and the central transmission/reception device and designed to measure and compare a propagation time of the functional signal from the functional device to the first transmission/reception device and a propagation time of the functional signal from the first transmission/reception device to the central transmission/reception device and to actuate or disable the function based on the comparison.

The apparatus is used, in particular, to identify a manipulation of one or more transmission/reception devices and thus prevent unauthorized access to functions of the motor vehicle.

For this purpose, the apparatus initially comprises a first transmission/reception device which is arranged at a first location of the motor vehicle.

A transmission/reception device may also be referred to as a transceiver, antenna or armature and is a device of the motor vehicle used to transmit and receive signals. In particular, the transmission/reception device is designed to receive signals wirelessly.

The first transmission/reception device is arranged in this case at a first location of the motor vehicle, in particular at or near a body part, such as in or on a fender, in or on a skirt, in or on a roof element, such as a roof liner, and/or in or on an A, B and/or C pillar. In particular, provision is made of more than one such transmission/reception device which are similar or identical in design, for example at least four, six, eight or ten such transmission/reception devices, each at different locations of the motor vehicle.

The transmission/reception device is designed in this case to receive a functional signal for actuating a function of the motor vehicle from a functional device different from the motor vehicle.

A functional device is in this case an independent object, different from the motor vehicle and spatially separable therefrom, and is used to trigger, perform or effect functions by way of a user of the motor vehicle, without the functional device itself having to be present in the motor vehicle. To this end, the functional device may be arranged at a distance from the motor vehicle for operation, for example 1 m, 2 m, 5 m or 10 m.

To this end, the functional device is designed to communicate, in particular wirelessly, with the motor vehicle or the transmission/reception devices. In particular, the functional device uses ultra-wideband technology (UWB) for this purpose. In particular, the functional signal comprises a characteristic pulse signal from which the desired function can be derived. In addition, the functional device can also support or use another radio technology using which the communication via UWB is prepared and/or initiated.

The functional device may be designed, in particular, as a proprietary piece of equipment, such as a key, transponder and/or fob, and provide one or more functions of the motor vehicle via dedicated keys or pushbuttons.

As an alternative or in addition, the functional device may also be designed as a mobile radio device, in particular as a smartphone, phablet, tablet and/or wearable, which also provides functions of the motor vehicle by means of one or more applications.

The first transmission/reception device is also designed, in particular, to send or to provide the received functional signal again to further transmission/reception devices and also a central transmission/reception device, which will be described in the following text.

The apparatus also comprises a central transmission/reception device which is arranged at a central location of the motor vehicle and likewise designed to receive the functional signal from the functional device.

The central transmission/reception device is formed in this case similarly or identically to the previously described transmission/reception devices. In particular, the central transmission/reception device is designed to receive the functional signal, or have said signal relayed, from the first transmission/reception device. In contrast to these other transmission/reception devices, however, the central transmission/reception device is, in particular, not arranged on or in a body part, but at a central location of the motor vehicle. The central transmission/reception device may also be designed to receive the functional signal directly from the functional device.

The central location in this case is, for example, a location which is approximately at a similar or equal distance from all sides of the motor vehicle and/or a location which is approximately at a similar or equal distance from all other transmission/reception devices. For example, the central transmission/reception device is at least 30 cm, 50 cm, 100 cm or 150 cm away from any other transmission/reception device.

In particular, the central location is a location near the passenger interior, for example in or on a dashboard, a center console and/or a firewall. In particular, the central location is no further than 10 cm, 30 cm, 50 cm or 100 cm away from a driver's seat and/or a driver's door of the motor vehicle.

The apparatus also comprises a control device which is in communication with the first transmission/reception device and the central transmission/reception device.

The control device is used to control, trigger and/or effect one or more functions of the motor vehicle, in particular also—but not exclusively—those that can be actuated by the functional device. The control device may in this case also be referred to as a control unit, in particular also as a central control unit.

The control device is in this case, in particular, connected to all transmission/reception devices and, in particular, also to the central transmission/reception device, in particular in a wired manner, for example via a bus, such as a CAN bus, and is designed to communicate with these devices and, in particular, to obtain information therefrom.

The control device is designed in this case to measure a propagation time of the functional signal from the functional device to the first transmission/reception device.

The control device is also designed to measure a propagation time of the functional signal from the first transmission/reception device to the central transmission/reception device.

A propagation time is the time needed by the functional signal to travel from the functional device to the first transmission/reception device or from the first transmission/reception device to the central transmission/reception device. This propagation time is usually in the millisecond, microsecond or nanosecond range and inevitably differs between two transmission/reception devices, even if they are arranged relatively close to each other.

Usually, each transmission/reception device and also the central transmission/reception device itself can calculate or determine the propagation time from the received functional signal and provide this to the control device. However, in addition or as an alternative, the control device may be designed to calculate or determine the respective propagation times.

The control device is further designed to compare these measured propagation times and to actuate or disable the function based on the comparison.

To this end, the control device may, in particular, receive information regarding the desired function from the first transmission/reception device and/or from the central transmission/reception device.

In particular, the control device is designed to set the propagation time of the functional signal from the functional device to the first transmission/reception device in relation to the propagation time of the functional signal from the first transmission/reception device to the central transmission/ reception device and, in the event of a deviation, in particular a deviation by a predetermined threshold value, which may be relative or absolute, not to trigger the function.

Conversely, the control device may be designed to trigger or effect the requested function in the event of a deviation below a predetermined threshold value.

The apparatus according to the invention makes it possible to identify manipulation, in particular a movement of the first transmission/reception device away from the motor vehicle, and to carry out suitable defensive measures.

This makes it possible to prevent unauthorized access to vehicle functions.

According to one development, the function comprises unlocking of the motor vehicle.

Unlocking may include one or more of the doors and all the doors of the motor vehicle. In addition or as an alternative, unlocking may include the trunk, in particular in connection with an automatic opening device that opens the trunk lid.

The unlocking may in this case be effected, in particular, by pressing a pushbutton on a key, transponder and/or fob and/or a button on a mobile radio device.

In particular, the unlocking may also take place contactlessly, that is to say without actual actuation of a pushbutton by a user, but purely by approaching the functional device. This type of function may also be referred to as keyless entry or convenient entry.

This development makes it possible to prevent unauthorized access to the interior particularly well.

According to one development, the function comprises ignition of the motor vehicle.

Ignition includes, in particular, the starting of an engine, in particular an internal combustion engine and/or an electric motor, and may also be referred to as providing, activating or initiating an engine function, according to which the motor vehicle can be moved or driven directly, for example by actuation of a gas pedal.

The ignition may in this case be carried out, for example, by actuating a pushbutton or button on the functional device and enable a so-called remote start, for example, to air-condition the vehicle, in particular to heat or cool the vehicle.

The ignition may also be achieved by actuation of a pushbutton or button in the motor vehicle which is not effected by an interaction with the functional device. In this case, however, the propagation time between the functional device and the first transmission/reception device and the propagation time between the functional device and the central transmission/reception device is measured and these are compared with one another in order to initiate this when a threshold value is undershot and to prevent this when the threshold value is exceeded.

This development makes it possible to prevent an unauthorized engine start particularly well.

A separate comparison can be made for both unlocking and ignition, and a two-stage test can be used as a basis therefor.

In particular, different threshold values, in particular higher threshold values or tolerances, can be set for the comparison for unlocking than for ignition. For example, a threshold value of 10%, 20%, 50% or 100% greater than a threshold value for ignition can be used as basis for the comparison for unlocking.

According to one development, the central transmission/reception device is connected to a motor vehicle device in a manner that cannot be non-destructively released.

In this context, non-destructively means that the central transmission/reception device and/or the motor vehicle device to which it is connected cannot be removed or separated therefrom without destroying, in particular irreparably, at least one of the transmission/reception devices and/or the motor vehicle device.

For example, the transmission/reception device and the motor vehicle device are adhesively bonded, welded, soldered to one another and/or at least partially integral with one another.

In particular, the motor vehicle device may be a central component or element of the motor vehicle. In particular, the motor vehicle device is the control device described above or another control device that performs or provides central and/or essential functions of the motor vehicle.

This development makes it possible to detect manipulation particularly reliably.

A method according to the invention for actuating a function of a motor vehicle in this case comprises the steps of receiving a functional signal for actuating a function of the motor vehicle at a first transmission/reception device which is arranged at a first location of the motor vehicle from a functional device different from the motor vehicle, receiving the functional signal at a central transmission/reception device which is arranged at a central location of the motor vehicle from the first transmission/reception device, and measuring a propagation time of the functional signal from the functional device to the first transmission/reception device, measuring a propagation time of the functional signal from the first transmission/reception device to the central transmission/reception device, comparing the propagation times and, based on the comparison, actuating or disabling the function by way of a control device which is in communication with the first transmission/reception device and the central transmission/reception device.

The method can be carried out, in particular, by an apparatus according to at least one embodiment described above.

A motor vehicle according to the invention comprises an apparatus according to at least one embodiment described above.

With regard to the embodiments of the method and of the motor vehicle as well as the advantages thereof, reference is made to the previously described embodiments of the apparatus and the advantages thereof.

Further features of the invention emerge from the claims, the figures and the description of the figures. The features and feature combinations mentioned above in the description, and the features and feature combinations mentioned below in the description of the figures and/or shown in the FIGURES alone, may be used not only in the respectively specified combination but also in other combinations or individually.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a schematic plan view of an embodiment of an apparatus and a method for actuating a function of a motor vehicle.

DETAILED DESCRIPTION OF THE DRAWINGS

In the FIGURES, the same reference signs denote the same or similar functions.

FIG. 1 shows a schematic plan view of an apparatus 100 and a method for actuating a function of a motor vehicle 1.

The apparatus 100 is in this case comprised by the motor vehicle 1 and is designed to perform or effect the method described in the following text.

The apparatus 100 in this case initially comprises a total of six transmission/reception devices 10, 20, 30, 40, 50 and 60 shown by way of example. In this case, a first transmission/reception device 10 is arranged on the left front fender, a second transmission/reception device 20 is arranged on the right front fender, a third transmission/reception device 30 is arranged at a left central position in the roof liner, a fourth transmission/reception device 40 is arranged at a right central position in the roof liner, a fifth transmission/reception device 50 is arranged on the left rear fender and a sixth transmission/reception device 60 is arranged on the right rear fender.

The transmission/reception devices 10, 20, 30, 40, 50, 60 are designed in this case to receive a functional signal for actuating a function of the motor vehicle 1 from a functional device 200 different from the motor vehicle 1 and located at a distance therefrom.

The apparatus 100 also comprises a central transmission/reception device 80 which is arranged at a central location of the motor vehicle 1 and designed to receive the functional signal from the functional device 200.

The apparatus 100 also comprises a control device 90 which is in communication with the transmission/reception devices 10, 20, 30, 40, 50, 60 and the central transmission/reception device 80 and designed to measure and compare a propagation time of the functional signal from the functional device 200 to the respective transmission/reception device 10, 20, 30, 40, 50, 60 and a propagation time of the functional signal from the respective transmission/reception device 10, 20, 30, 40, 50, 60 to the central transmission/reception device 80 and to actuate or disable the function based on the comparison.

The function in this case comprises both unlocking of the motor vehicle 1 and ignition of the motor vehicle 1.

The central transmission/reception device 80 is in this case connected to the control device 90 in a manner that cannot be non-destructively released.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Motor vehicle
10 First transmission/reception device
20 Second transmission/reception device
30 Third transmission/reception device
40 Fourth transmission/reception device
50 Fifth transmission/reception device
60 Sixth transmission/reception device
80 Central transmission/reception device
90 Control device
100 Apparatus
200 Functional device

What is claimed is:
1. An apparatus for actuating a function of a motor vehicle, comprising:

a first transmission/reception device arranged at a first location of the motor vehicle and configured to receive a functional signal for actuating a function of the motor vehicle from a functional device different from the motor vehicle;

a central transmission/reception device arranged at a central location of the motor vehicle and configured to receive the functional signal from the first transmission/reception device; and a control device in communication with the first transmission/reception device and the central transmission/reception device, wherein the control device is configured to:

measure and compare a propagation time of the functional signal from the functional device to the first transmission/reception device and a propagation time of the functional signal from the first transmission/reception device to the central transmission/reception device, and actuate or disable the function based on the comparison.

2. The apparatus of claim 1, wherein the function comprises unlocking of the motor vehicle.

3. The apparatus of claim 1, wherein the function comprises ignition of the motor vehicle.

4. The apparatus of claim 1, wherein the central transmission/reception device is connected to a motor vehicle device in a manner that cannot be non-destructively released.

5. A method for actuating a function of a motor vehicle, comprising:

receiving a functional signal for actuating a function of the motor vehicle at a first transmission/reception device arranged at a first location of the motor vehicle and from a functional device different from the motor vehicle;

receiving the functional signal at a central transmission/reception device arranged at a central location of the motor vehicle and from the first transmission/reception device;

measuring a propagation time of the functional signal from the functional device to the first transmission/reception device;

measuring a propagation time of the functional signal from the first transmission/reception device to the central transmission/reception device;

comparing the propagation times; and based on the comparison, actuating or disabling the function by way of a control device in communication with the first transmission/reception device and the central transmission/reception device.

6. The method of claim 5, wherein the function comprises unlocking of the motor vehicle.

7. The method of claim 5, wherein the function comprises ignition of the motor vehicle.

8. A motor vehicle comprising the apparatus of claim 1.

* * * * *